UNITED STATES PATENT OFFICE.

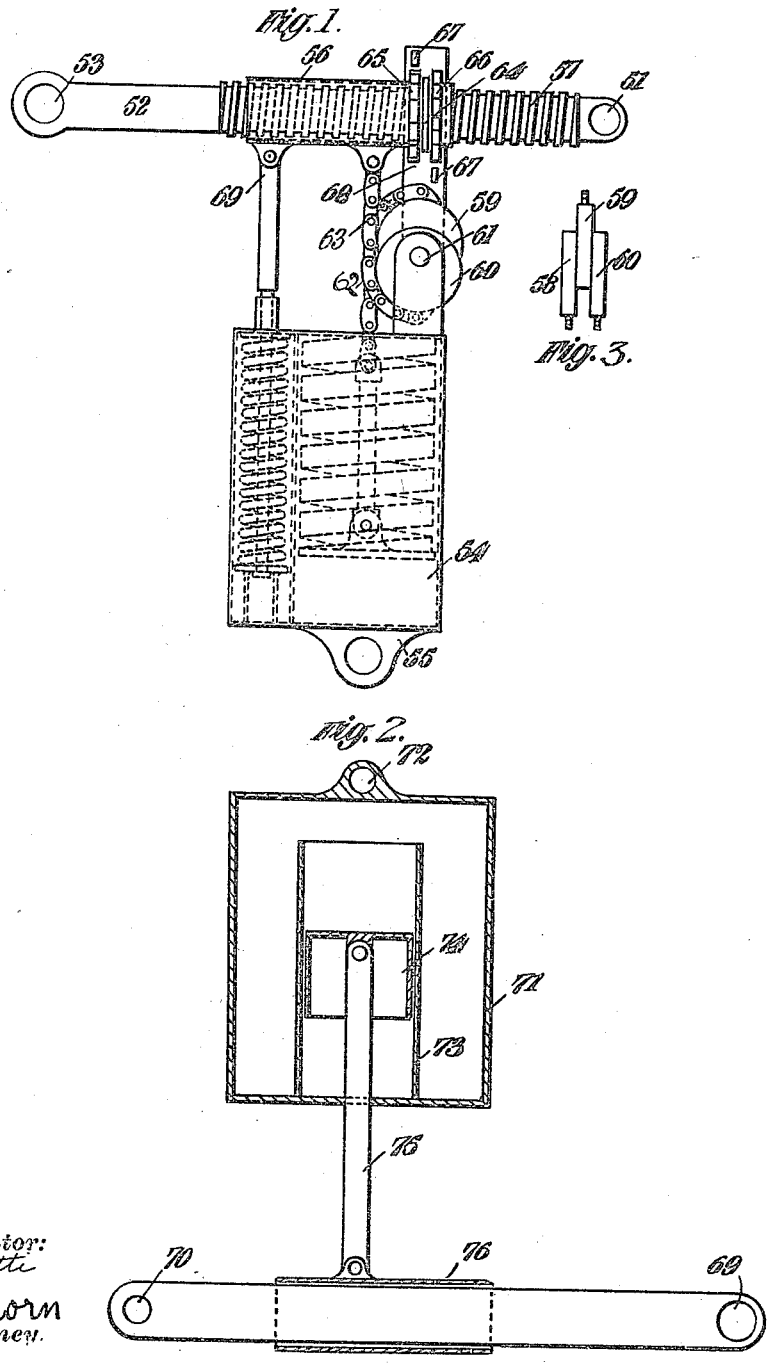

ANTOINE MUTTI, OF COBHAM, ENGLAND.

MOTOR AND OTHER VEHICLE.

1,165,701.

Specification of Letters Patent. Patented Dec. 28, 1915.

Application filed June 6, 1914. Serial No. 843,464.

*To all whom it may concern:*

Be it known that I, ANTOINE MUTTI, a subject of the King of Great Britain, residing at Portsmouth Road, Cobham, in the county of Surrey, England, have invented certain new and useful Improvements in or Relating to Motor and other Vehicles, of which the following is a specification.

This invention relates to suspension devices for motor and other vehicles of the kind in which the wheels are connected with the chassis or body of the vehicle through the medium of pivoted members or devices which are adapted to act upon suitably disposed springs or other resilient devices, the arrangement being such that the action of the resilient devices is magnified while means are provided for altering the leverage at which the said devices act.

Suspension devices of the above kind suffer from the defect that they produce oscillations of considerable amplitude if the body of the vehicle is raised or lowered to an extent above the normal, and the chief object of my invention is to overcome this disadvantage.

According to my invention a suspension device of the kind described is used in conjunction with auxiliary resilient means which act with or in opposition to the main spring in such a manner as to prevent oscillation.

In carrying out the invention the alteration in leverage to accommodate different loads may be effected automatically and a progressive leverage is obtained, that is to say the leverage varies as the resilient means are compressed or expanded.

In order that the invention may be clearly understood and readily carried into effect, it will now be more fully described with reference to the accompanying drawings which are of a more or less diagrammatic character and in which:

Figure 1 is an elevation of one form of the suspension device constructed according to the invention. Fig. 2 illustrates a modification of the device. Figs. 3 and 4 are details.

Referring to Fig. 1 which illustrates a form of construction permitting of obtaining a progressive leverage synchronizing with the compression and extension of the main spring, as well as an automatic adjustment for different loads, the wheel axle is connected at the point 51 to a lever 52 which is pivoted at 53 to the vehicle body. The cylinder 54 containing the main spring and a piston, is pivoted at 55 to the body and the piston rod is connected through the medium of chains and a double eccentric to a sleeve 56 which can slide over a screw thread 57 on the lever 52. The double eccentric is built up of three disks 58, 59 and 60 and is rotatably mounted on a short shaft 61 suitably supported on the cylinder 54. On each of the outside disks one end of a chain 62 is fixed the other end being secured to the sleeve 56, while a chain 63 is connected at one end to the middle disk and at the other end to the piston rod. It will be seen from the drawing that each of the outer chains is connected to its disk at a point which is substantially opposite the point at which the center chain is connected to the disk 59.

Automatic adjustment of the sleeve 56 is effected for instance by means of a nut 64 which engages with the screw thread 57 and is provided with two sets of ratchet teeth 65 and 66 which are adapted to engage with stops 67 on an extension 68 of the cylinder. Connection is made between the sleeve and the nut in such a manner that the nut is free to turn but cannot move axially without moving the sleeve. Any suitable arrangement may be employed for this purpose, for instance, the sleeve may be provided with a flange which is received within a groove formed in a portion of the nut which extends over the sleeve as shown in Fig. 4. An auxiliary spring is used in order to preserve the proper height of the vehicle body and prevent oscillation, said spring, as shown, being arranged in the cylinder 54 at the side of the main spring and acting upon a rod 69 which is pivoted to the sleeve.

Fig. 2 shows a form of construction in which compressed air or other suitable gas is employed instead of a spiral spring. The wheel axle is connected at 69 to a lever which is pivoted at 70 to the vehicle body. The cylinder 71 which is pivoted at 72 to the body and is filled with compressed gas has within it a small concentric cylinder 73 within which works a piston 74 having a rod 75 connected to a sleeve 76. The construction and operation of this sleeve is the same as in Fig. 1 and need not be further described.

The piston 74 is of small diameter and acts upon a comparatively large volume of compressed air, so that the pressure within the cylinder 71 remains nearly constant thus giving an even support.

An auxiliary spring is used with this construction and is suitably arranged between the body and the axle outside the compressed air cylinder.

What I claim and desire to secure by Letters Patent of the United States is:—

1. In a suspension device for vehicles, the combination of levers adapted to be pivotally connected to the chassis and to the wheel axles, of main resilient devices interposed between the chassis and the levers, of means for obtaining a progressive leverage comprising disks arranged between the resilient devices and the levers and connected to the former and disks eccentrically secured to the above mentioned disks and connected to the levers, of means for varying the leverage at which the main resilient devices act, and of auxiliary resilient devices arranged between the levers and the chassis.

2. In a suspension device for vehicles, the combination of levers adapted to be pivotally connected to the chassis and to the wheel axles, of cylinders adapted to be pivoted to the chassis, of resilient devices contained within said cylinder and of means connecting said resilient devices with the levers whereby a progressive leverage is obtained, said means comprising disks connected to the resilient devices and disks secured to the above mentioned disks and arranged eccentrically thereto and connected to the levers.

3. In a suspension device for connecting each wheel of a vehicle to the chassis, the combination of a lever adapted to be connected at one end to the wheel axle and at the other end to the chassis, of a resilient device interposed between the chassis and the lever, of a screw thread formed on said lever, of a sleeve surrounding the lever and adapted to slide over the screw thread, of means for connecting the sleeve to the resilient device, of a nut engaging with the sleeve and with the screw thread, and of means for automatically turning said nut thereby altering the leverage at which the resilient device acts.

4. In a suspension device for connecting each wheel of a vehicle to the chassis, the combination of a lever adapted to be connected at one end to the wheel axle and at the other end to the chassis, of a cylinder adapted to be pivoted to the chassis, of a resilient device contained within said cylinder, of a screw thread formed on the lever, of a sleeve surrounding said lever and adapted to slide thereon, of a nut engaging with the lever and with the screw thread, of two ratchet wheels arranged on the nut with their teeth projecting in opposite directions, of an extension on the cylinder projecting past the nut, and of projections on said extension adapted to engage with the aforesaid ratchet wheels when excessive movement takes place, thus turning the nut and altering the leverage at which the resilient device acts.

5. In a suspension device for connecting each wheel of a vehicle to the chassis, the combination of a lever adapted to be connected at one end to the wheel axle and at the other end to the chassis, of a cylinder adapted to be pivoted to the chassis, of a spring contained within said cylinder, of a piston working within the cylinder and acting upon the spring, of a rod attached to said piston, of a disk rotatably mounted upon the cylinder, of a chain connecting the aforesaid road to the disk, of two disks secured to the above mentioned disk and arranged eccentrically thereto, and of chains connecting said disks to the lever.

6. In a suspension device for connecting each wheel of a vehicle to the chassis, the combination of a lever adapted to be connected at one end to the wheel axle and at the other end to the chassis, of a cylinder adapted to be pivoted to the chassis, of a main spring contained within said cylinder, of a piston working within the cylinder and acting upon the spring, of eccentrically arranged disks connected to the piston and to the lever whereby a progressive leverage is obtained, of means for automatically varying the leverage at which the spring acts, and of an auxiliary spring contained within the cylinder and connected to the lever.

In testimony whereof I affix my signature in presence of two witnesses.

ANTOINE MUTTI.

Witnesses:
W. J. SKERTEN,
T. SELLEY WARDLE.

Copies of this patent may be obtained for five cents each, by addressing the "Commissioner of Patents, Washington, D. C."